United States Patent Office 3,801,607
Patented Apr. 2, 1974

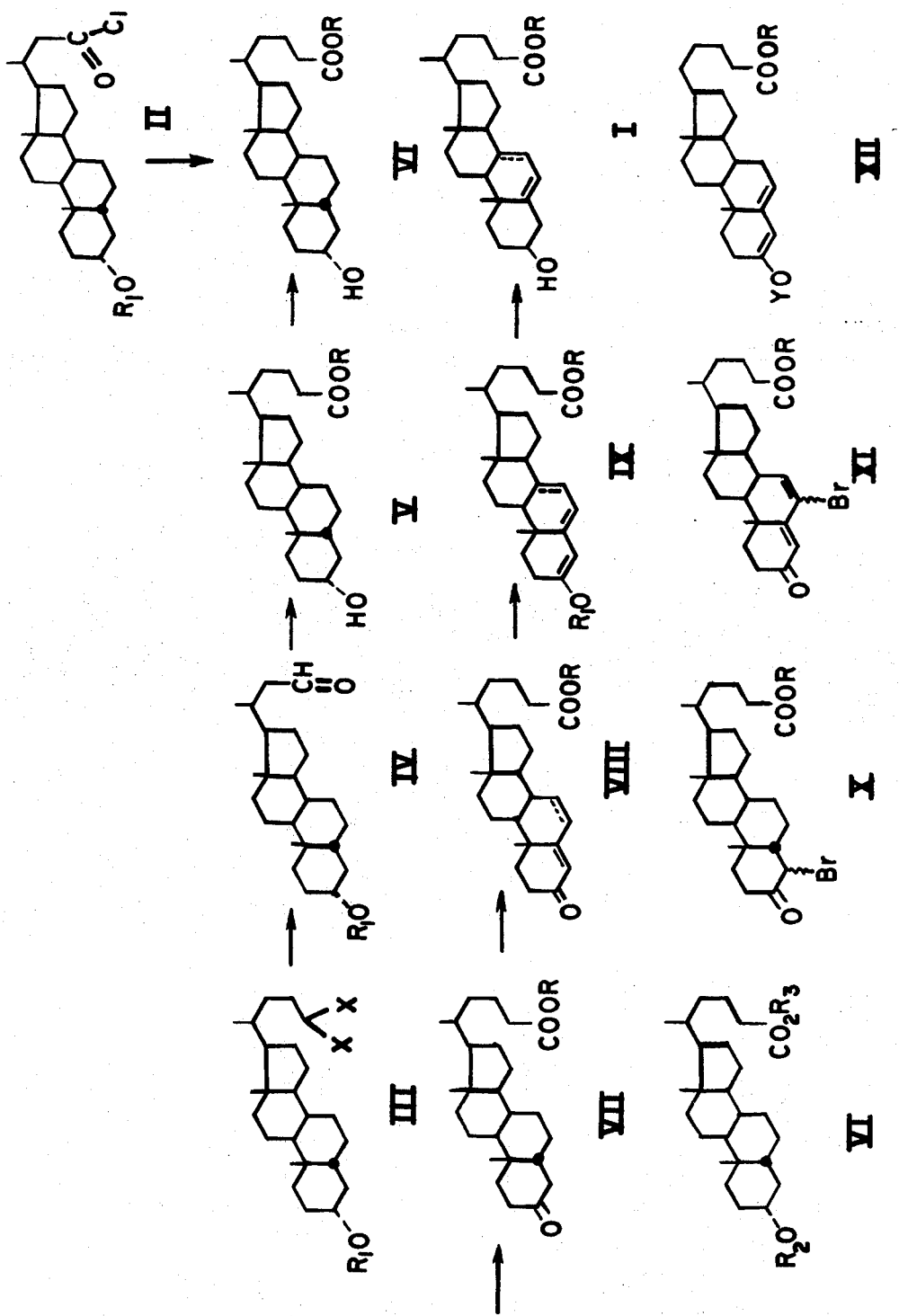

---

3,801,607
DERIVATIVES OF DINORCHOLESTANE AND PROCESS
Bernard Goffinet, Paris, France, assignor to Roussel-UCLAF, Paris, France
Filed Mar. 10, 1972, Ser. No. 233,767
Claims priority, application France, Mar. 11, 1971, 8,475
Int. Cl. C07c *169/52*
U.S. Cl. 260—397.1                                     21 Claims

ABSTRACT OF THE DISCLOSURE

A process for the preparation of lower alkyl esters of 26,27-dinorcholesten-25-oic acids of the Formula I

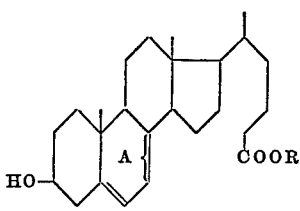

wherein R is lower alkyl and A is two hydrogens or a double bond and intermediates so produced. The compounds of the Formula I are intermediates in the synthesis of 25-hydroxy cholesterol and 25-hydroxy-7(8)-dehydro-cholesterol. These latter compounds are themselves intermediates in the preparation of 25-hydroxy-cholecalciferol which possesses an important anti-rachitic property, superior to that of cholecalciferol or vitamin $D_3$.

THE PRIOR ART 25-hydroxy-cholesterol has been prepared up to the present by a Grignard reaction on norcholestenolone (3β-hydroxy-25-oxo-27-nor-cholest-5-ene), as described by Ryer et al., J. Am. Chem. Soc. 72, 4247 (1950).

Norcholestenolone is one of the by-products of the oxidation of dibromocholesterol acetate by chromic acid. It is known that this oxidation reaction leads, with very low yields after difficult isolations and purifications, to numerous products, namely, androstenolone, pregnenolone, norcholestenolone, 3β-hydroxy-chol-5-en-24-oic acid, etc., as described, for example by Ruzicka et al., Helv. Chim. Acta, 20, 1291 (1937) and Butenandt et al., Z. Physiol. Chem. 237, 57 (1935).

This oxidation reaction of dibromocholesterol has been formerly utilized industrially in order principally to prepare androstenolone which is a key compound allowing access to the principal sex hormones. However, since the development of new processes using starting materials of vegetable origin (sapogenines) which are more readily converted into androstenolone, the reaction of the degradation of cholesterol is no longer utilized in industry.

This results that norcholestenolone is not actually a satisfactory starting material for the industrial synthesis of 25-hydroxy-cholesterol. More recently, 25-hydroxy-cholesterol has been prepared by a Grignard reaction on an ester of 3β-hydroxy-26,27-dinor-cholest-5-en-25-oic acid [Campbell et al., Steroids, 13, 567–577 (1969)]. This latter acid was obtained by homologation of 3β-hydroxy-chol-5-en-oic acid according to an Arndt-Eistert reaction; see Dauben, J. Am. Chem. Soc. 74, 599 (1952).

However, 3β-hydroxy-chol-5-en-24-oic acid is one of the products of the degradation reaction of cholesterol, as indicated above. For the same reasons as those above, this cholenoic acid is not presently a satisfactory starting material for the industrial synthesis of 25-hydroxy-cholesterol.

3β-hydroxy-26,27-dinorcholest-5-en-25-oic acid has also been obtained by cleavage of norcholestenolone by means of an oxidizing agent (French Pat. No. 1,334,932). It is evident from the above, that this reaction also presents no interest for the synthesis of 25-hydroxy-cholesterol.

OBJECTS OF THE INVENTION

An object of the present invention is a process for the production of dinorcholestane derivatives useful in the production of compounds having anti-rachitic properties.

A further object of the invention is the development of a process for the preparation of esters of 26,27-dinorcholestadien-25-oic acid of the formula

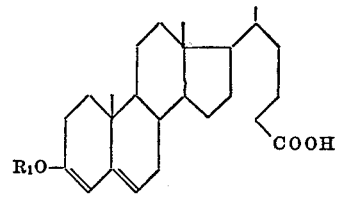

wherein $R_1$ represents the acyl of an organic carboxylic acid having 1 to 10 carbon atoms and R represents lower alkyl, which consists essentially of the steps of
(a) Subjecting a compound of the formula

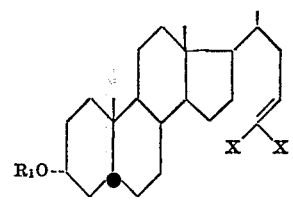

wherein $R_1$ represents the acyl of an organic carboxylic acid having from 1 to 10 carbon atoms and X represents a member selected from the group consisting of lower alkyl, cycloalkyl having 5 to 6 carbon atoms and phenyl, to the action of ozone and thereafter to the action of a reducing agent,
(b) Performing a Wittig reaction on the resultant compound of the formula

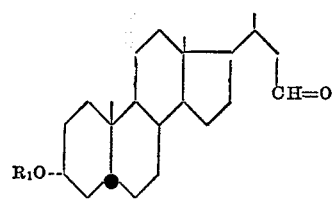

wherein $R_1$ has the above-assigned meaning,
(c) Subjecting the resultant compound of the formula

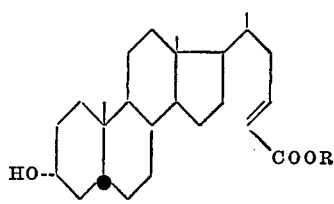

wherein R represents lower alkyl, to a catalytic hydrogenation,
(d) Oxidizing the resultant compound of the formula

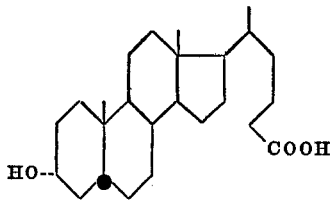

wherein R has the above-assigned meaning, by the action of an oxidizing agent capable of oxidizing a hydroxy to a ketone,
(e) Brominating the resultant compound of the formula

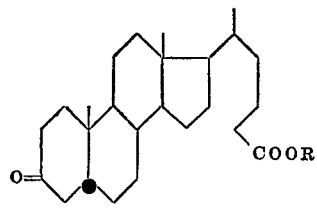

wherein R has the above-assigned meaning, by the action of a monobrominating agent,
(f) Reacting the resultant compound of the formula

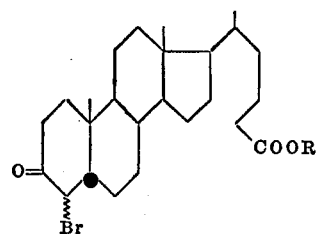

wherein R has the above-assigned meaning, with a dehydrobrominating agent,
(g) Reacting the resultant compound of the formula

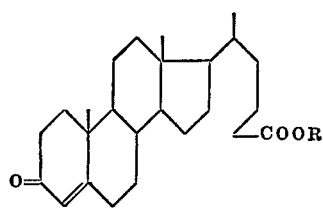

wherein R has the above-assigned meaning, with an acylating derivative of an organic carboxylic acid having 1 to 10 carbon atoms, and
(h) Recovering said esters of 26,27-dinorcholestadien-25-oic acid.

A yet further object of the invention is the obtention of the novel intermediates
(a) A compound of the formula

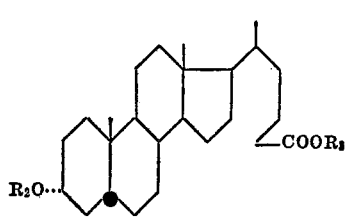

wherein $R_2$ is a member selected from the group consisting of hydrogen and the acyl of an organic carboxylic acid having 1 to 10 carbon atoms and $R_3$ is a member selected from the group consisting of hydrogen and lower alkyl.

(b) A compound of the formula

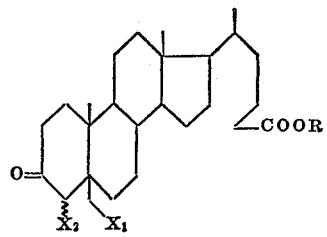

wherein R is lower alkyl, $X_1$ is a $5\beta$ hydrogen and $X_2$ is a member selected from the group consisting of hydrogen and bromine.
(c) A compound of the formula

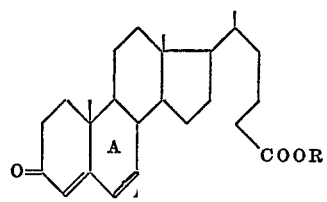

wherein R is lower alkyl and A is a member selected from the group consisting of two hydrogens and a double bond.
(d) A compound of the formula

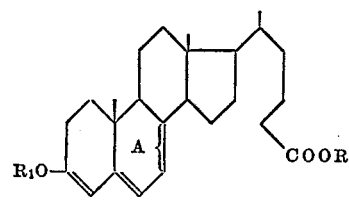

wherein R is lower alkyl, $R_1$ is the acyl of an organic carboxylic acid having 1 to 10 carbon atoms and A is a member selected from the group consisting of two hydrogens and a double bond.
(e) A compound of the formula

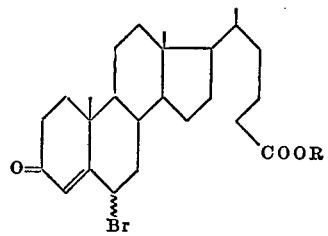

wherein R is lower alkyl, and
(f) A compound of the formula

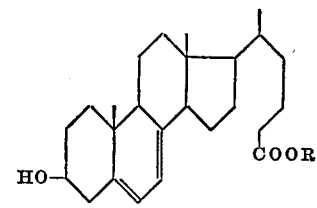

wherein R is lower alkyl.
These and other objects of the invention will become more apparent as the description thereof proceeds.

THE DRAWING

The figure is a schematic flow diagram of the process.

DESCRIPTION

The present invention relates to a process for the preparation of lower alkyl esters of 26,27-dinorcholesten-25-oic acids of the Formula I

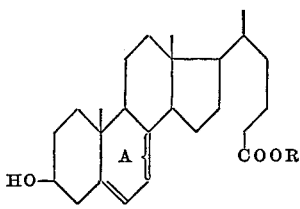

(I)

wherein R is lower alkyl and A is two hydrogens or a double bond and intermediates so produced. The compounds of the Formula I are intermediates in the synthesis of 25-hydroxycholesterol and 25-hydroxy-7(8)-dehydro-cholesterol. These latter compounds are themselves intermediates in the preparation of 25-hydroxy-cholecalciferol which possesses an important anti-rachitic property, superior to that of cholecalciferol or vitamin $D_3$ [see, for example, Campbell et al., Steroids, 13, 567–577 (1969)].

This process of the invention is represented schematically on the drawing. For consistency hereafter, the letter $a$ will be used for Formulas VIII, IX and I where they designate unsaturated compounds having a double bond in position 4(5) in Formula VIII and in position 5(6) in Formulas IX and I, and the letter $b$ will be used in formulas to designate unsaturated compounds having the double bond system $\Delta^{4,6}$ in Formula VIII and $\Delta^{5,7}$ in Formulas IX and I.

It will be noted that the products of Formula Ib can be transformed into 25-hydroxy-cholecalciferol, either by a Grignard reaction then irradiation-isomerization, or, by reversing the order of the reactions, by irradiation-isomerization then the Grignard reaction. These two methods of preparation are described in the article by Campbell et al., cited above, and the published French patent application No. 2,012,069.

The present invention rests particularly in the discovery of a new process of synthesis of 3β-hydroxy-26,27-dinorcholest-5-en-25-oic acid starting from products of transformation of lithocholic acid. This process consists principally of transforming a derivative of lithocholic acid into its higher homolog, then introducing a double bond in the 5 position. These operations are effected according to methods known per se.

The advantage of the new synthesis of the invention resides principally in the choice of a starting material easily obtainable in view of industrial utilization. In fact, lithocholic acid is, along with cholic acid and desoxycholic acid, one of the three principal bile acids isolated from the bile of cattle.

Lithocholic acid can also be prepared starting from other bile acids, such as cholic acid, desoxycholic acid, hyodesoxycholic acid; see Fieser and Fieser, Steroids, Reinhold Publishing Corp., New York (1959), pages 77–81 and French Pat. No. 1,418,446.

Another advantage of the process of the invention is that it leads to intermediates which permit, if desired, the introduction of a supplementary double bond in the 7(8) position. According to this variant of the process, a derivative of dinorcholesta-5,7-dienoic acid is obtained, which by a Grignard reaction is transformable into 7(8)-dehydro-25-hydroxy-cholesterol. This dinorcholestadienoic acid was obtained by Campbell et al., cited supra, by allylic bromination and dehydrobromination of the corresponding dinorcholest-5-enoic acid. However, this reaction of allylic bromination leads to irregular results and to only low yields.

The present invention is concerned in the first place to the particular step of the preparation of the compounds of Formula I.

According to the invention, the compounds of the Formula I

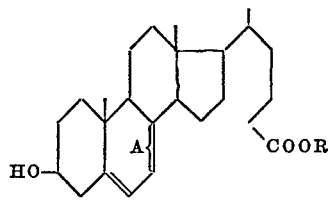

(I)

wherein R is lower alkyl, such as methyl, and A is selected from the group consisting of two hydrogens and a double bond, are prepared by a process characterized by reacting a compound of the Formula VIII

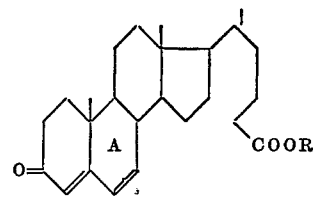

(VIII)

wherein R and A have the above-assigned meanings, with an acylation agent in order to form a compound of the Formula IX

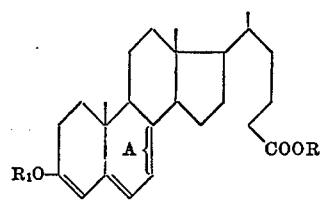

(IX)

wherein R and A have the above-assigned meanings and $R_1$ represents the acyl of an organic carboxylic acid, reducing the 3(4) double bond in this latter compound by a mixed hydride and isolating the desired compound of Formula I.

In the above-described process, as well as hereafter, the substituent R is lower alkyl, preferably of 1 to 6 carbon atoms, such as methyl, ethyl, n-propyl, isopropyl, etc. Also the substituent $R_1$ is the acyl of an organic carboxylic acid having preferably from 1 to 10 carbon atoms. $R_1$ represents particularly the acyl of a saturated or unsaturated, aliphatic or cycloaliphatic acid, and especially an alkanoic acid having from 1 to 10 carbon atoms, such as formic acid, acetic acid, propionic acid, butyric acid, isobutyric acid; a cycloalkylcarboxylic acid or a cycloalkylalkanoic acid having from 4 to 10 carbon atoms, such as cyclopropyl-, cylopentyl- or cyclohexyl-carboxylic acid, ylopentyl- or yclohexyl-acetic or propionic acids; an arylcarboxylic acid, particularly benzoic acid or an alkylbenzoic acid having from 8 to 10 carbon atoms, such as toluenic acid; or an aryl-alkanoic acid, particularly a phenylalkanoic acid or an alkylphenyl-alkanoic acid having from 8 to 10 carbon atoms, such as phenyl-acetic or propionic acid.

In order to prepare, according to this process, a compound of the Formula Ia

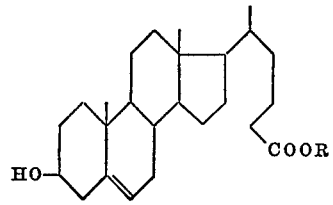

(Ia)

a compound of the Formula VIIIa

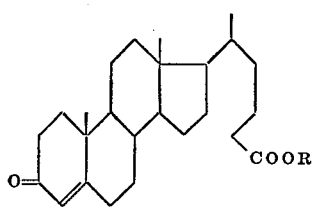

(VIIIa)

is reacted with an acylation agent in order to form a compound of the Formula IXa

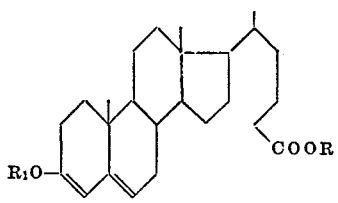

(IXa)

wherein $R_1$ and R have the above-assigned meanings, and the latter Compound IXa is subjected to the action of a mixed hydride.

In the same manner, a compound of the Formula Ib

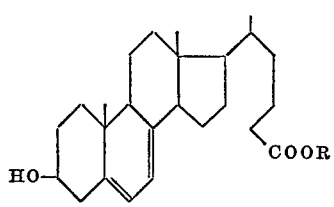

(Ib)

is prepared by reacting a compound of the Formula VIIIb

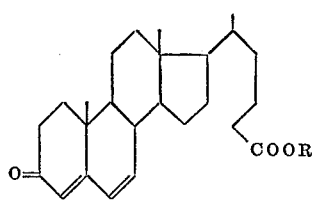

(VIIIb)

with an acylation agent in order to form a compound of the Formula IXb

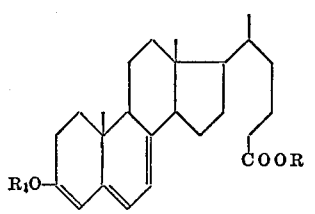

(IXb)

wherein $R_1$ and R have the above-assigned meanings, and the latter Compound IXb is subjected to the action of a mixed hydride.

The invention also is directed to a process such as defined above, where a product of the Formula VIIIa is prepared by subjecting a compound of the Formula VI

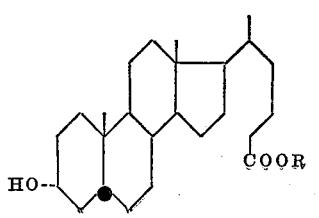

(VI)

where R is lower alkyl, to the action of an oxidizing agent in order to form a compound of the Formula VII

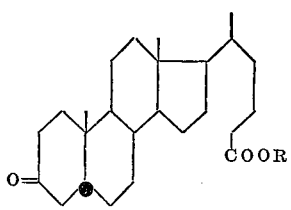

(VII)

and the double bond in the 4(5) position is introduced according to known methods.

The invention is also directed to a process such as defined above, where a compound of the Formula VIIIb is prepared by introducing a double bond in the 6(7) position of a compound of Formula VIIIa according to known methods. The compound of the Formula VIIIb is next transformed into a compound of Formula Ib according to the methods described above.

A compound of Formula VIIIb can also be prepared by subjecting a compound of the Formula Ia to the action of a dehydrogenating agent selected from the group consisting of a quinone in the presence of an aluminum alcoholate, or manganese dioxide. The compound of Formula VIIIb is then transformed into a compound of Formula Ib as described above.

In order to prepare, also according to the invention, the compounds of Formula VI

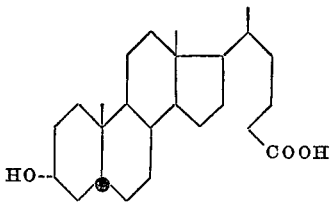

(VI)

a compound of the Formula III

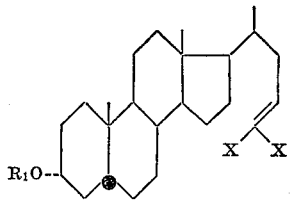

(III)

wherein $R_1$ represents the acyl of an organic carboxylic acid and X represents a lower alkyl, a cycloalkyl or an aryl, is subjected to the action of ozone. The ozonide formed is subjected to the action of a reducing agent in order to give a compound of the Formula IV

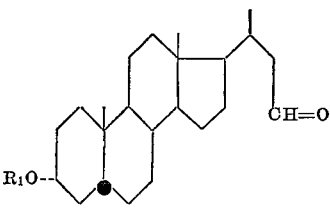

(IV)

This latter compound is transformed by a Wittig reaction into a compound of the Formula V

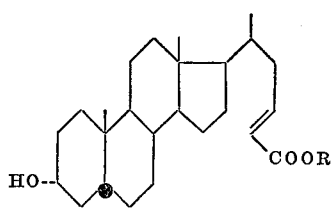

(V)

wherein R and $R_1$ have the above-assigned meanings, and the latter compound is subjected to a catalytic hydrogenation to give a compound of Formula VI.

In the above-described process, when X represents a lower alkyl, it is preferably an alkyl having from 1 to 6 carbon atoms; when X represents cycloalkyl, it is preferably a cycloalkyl having from 5 to 6 carbon atoms; and when X represents aryl (such as phenyl), it is preferably an aryl having from 6 to 10 carbon atoms.

The compound of Formula III, utilized as starting compounds in the process of the invention, are either known or easily obtained starting from lithocholic acid by application of known methods; see, for example, Meystre et al., Helv. Chim. Acta 29, 33 (1946).

The compounds of Formula VI can also be prepared by the Arndt-Eistert reaction. According to this reaction, a compound of the Formula II

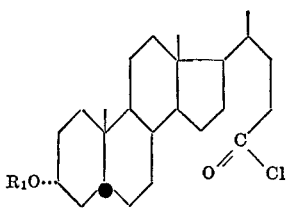

in which $R_1$ has the above-assigned meaning, is subjected to the action of diazomethane to form a compound of the formula

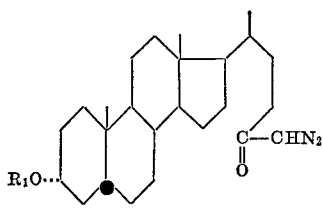

which is decomposed by the action of water or a lower alkanol of the Formula ROH, in the presence of a metallic catalyst, particularly a catalyst based on silver, in order to form a compound of the Formula VI'

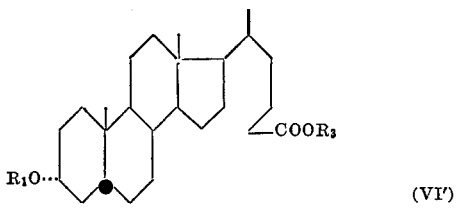

(VI')

wherein $R_1$ has the above-assigned meaning and $R_3$ represents hydrogen or lower alkyl (R). This latter compound is saponified by the action of an alkaline base in order to form a compound of the formula

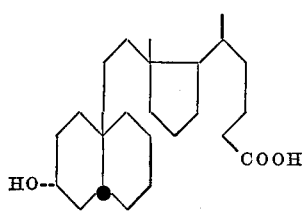

which is esterified on the carboxyl group with a lower alkanol according to known methods to give a compound of the Formula VI.

The acid chlorides of the compound of Formula II, utilized as starting materials in the above process are either known or easily obtained starting from lithocholic acid by application of known methods; see, for example, J. Am. Chem. Soc. 67, 740 (1945).

Some other characteristics of these processes, as well as the preferred methods of execution, are described here below.

(a) Ozonization, passage of Compound III to Compound IV

This reaction is effected by bubbling a stream of ozonized oxygen through a solvent solution of Compound III, in a solvent which is inert under the reaction conditions such as methylene chloride, chloroform, carbon tetrachloride or ethyl acetate. The reaction is conducted at temperatures below 0° C. and preferably from —75° C. to —50° C., especially about —60° C.

The reducing agent utilized to reduce the ozonide formed is preferably zinc in the presence of acetic acid. Also, however, a lower alkyl phosphite, such as trimethyl phosphite, or a dialkyl sulfide, such as dimethyl sulfide, can be utilized. The reaction is conducted in the solvent solution of the ozonide obtained as above at reduced temperatures of from —75° C. to +10° C. The desired product of Compound IV is preferably isolated by formation of its 23-oxo ketal, such as the dimethyl ketal and subsequent acidic hydrolysis.

(b) Wittig reaction, passage of Compound IV to Compound V

For this reaction, particularly a lower alkyl O,O-lower alkylphosphonoacetate is utilized having the formula

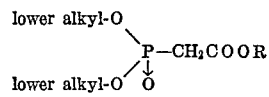

for example methyl O,O-diethylphosphonoacetate, in the presence of a strong base. An alkylidene phosphorane of the formula

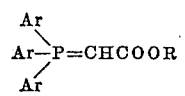

in which Ar is aryl, such as phenyl and R is lower alkyl, may also be utilized in the Wittig reaction.

The reaction is effected under the usual conditions employed in Wittig reactions. The strong base utilized in the case of the use of the phosphonoacetates is particularly an alkali metal alcoholate, especially an alkali metal lower alkanolate, such as sodium methylate or sodium ethylate; an akali metal hydride or an alkali metal amide.

The reaction is effected in a lower alkanol (in the presence of its alkali metal alcoholate), or also in an ether (such as diethyl ether, tetrahydrofuran, etc.) an amide (such as dimethylformamide), or a hydrocarbon, (such as benzene, toluene or cyclohexane).

The obtention of the ethyl ester of 3-hydroxy-26,27-dinorcholest-23-ene-25-oic acid (an intermediate in the synthesis of cholestane-23,24,25-triol), by the action of carbethoxy-methylenetriphenylphosphorane on 3-hydroxy-23-oxo-24-nor-cholane is described in the published Japanese patent application No. 22,542/70. The 23-oxo derivative is obtained in this patent by branching of the nor-cholanic chain on a pregnane derivative.

(c) Catalytic hydrogenation, passage of Compound V to Compound VI

This reaction is effected by the action of hydrogen in the presence of a catalyst. Particularly a hydrogenation catalyst based on palladium, platinum or nickel is utilized.

(d) Oxidation reaction, passage of Compound VI to Compound VII

The customary oxidizing agents for the oxidation of secondary alcohols are employed. In particular, a metallic oxide such as chromic anhydride, for example the Jones reactant (chromic acid anhydride and sulfuric acid in an aqueous medium) is employed. Bromine in the presence of a buffer allowing neutralization of the hydrobromic acid formed, can also be employed. In addition, an N-haloamide, such as N-bromoacetamide or N-bromosuccinimide can also be employed as an oxidizing agent, while operating, for example, in tertiary butanol or acetone, in the presence of water or pyridine. The oxidizing agent can also be a ketone such as cyclohexanone in the presence of an aluminum alcoholate (Oppenauer reaction). The oxidation may also be conducted by means of cyclohexanone in the presence of Raney nickel.

(e) Introduction of a double bond in the 4 position, passage of Compound VII to Compound VIIIa This reaction is preferably effected by a reaction of bromination in the 4 position followed by dehydrobromination. According to this method, a compound of the Formula VII

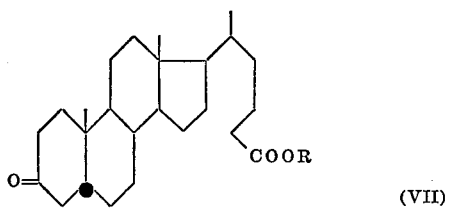

(VII)

wherein R is lower alkyl, is reacted with a bromination agent in order to form a compound of the Formula X

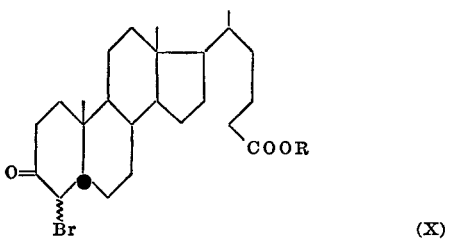

(X)

which compound is subjected to a dehydrobromination reaction according to known methods.

The bromination agent employed is preferably bromine, the reaction being conducted in the presence of hydrobromic acid in a dialkylamide such as dimethylformamide. However, other brominating agents such as an alkali metal bromate, for example, potassium bromate, in an acid medium; perbromopyridine hydrobromide in the presence of an acid; or N-bromosuccinimide in an alcohol such as tertiary butanol or benzyl alcohol; may be employed in the reaction.

A compound of Formula X is obtained where the bromine is in the α or β-position.

Also a compound of the Formula X can be obtained directly by a reaction of a compound of the Formula VI with bromine in the presence of an acid.

The dehydrobromination of Compound X is effected according to known methods, for example by means of a lithium halide in a dialkylamide such as dimethylformamide heated to reflux, preferably in the presence of lithium carbonate. The dehydrobromination can also be effected by heating Compound X in a pyridinic base, such as pyridine, collidine, picoline, lutidine, etc., or also by the action of a hydrazine, an alkylhydrazine or a phenylhydrazine (for example, dinitrophenylhydrazine) or by the action of a semicarbazide, followed by an exchange reaction with a carbonylated derivative such as formaldehyde, glyoxal, glyoxylic acid, levulinic acid or pyruvic acid, in order to cleave the hydrazone or semicarbazone formed.

(f) Formation of the enolic ester, passage of Compound VIII to Compound IX

This reaction is an acylation reaction of the Δ⁴-3-oxo compound. The acylation agent is preferably the acid anhydride of the formula $(R_1CO)_2O$, where $R_1$ has the above-assigned meaning, or a mixture of the anhydride and of the corresponding acid chloride. The reaction is conducted either in the presence or in the absence of a tertiary base such as pyridine. In order to form the enolic ester of Compound VIIIb, the reaction is preferably conducted in the presence of a tertiary base. For example, in order to prepare the enolic acetate, a mixture of acetic acid anhydride and acetyl chloride is employed.

The enolic acetate can also be prepared by the action of isopropenyl acetate in the presence of an acid catalyst such as, p-toluenesulfonic acid or sulfuric acid.

(g) Reduction of the enolic ester, passage of Compound IX to Compound I

The enolic ester of Compound IX is reduced by a mixed hydride. This mixed hydride is preferably an alkali metal borohydride such as potassium or sodium borohydride. The reducing agent can also be lithium aluminum hydride or lithium tri-tert.-butoxy-aluminum hydride. The use of these reducing agents leads most often to a, at least partial, saponification of the ester group on the lateral chain. Generally, therefore, a mixture of the ester of Compound I and the corresponding free acid are obtained.

In order to totally transform Compound IX into the ester of the compound of Formula I, it is thus advantageous to submit the mixture obtained after the reduction to an esterification reaction according to the usual methods, for example, by the action of a diazo-lower alkane or of the alcohol ROH in the presence of an acid catalyst such as hydrochloric acid, p-toluenesulfonic acid, or also acetyl chloride.

(h) Introduction of a double bond in the 6(7) position in Compound VIII, passage of Compound VIIIa to Compound VIIIb In order to introduce this double bond, according to the actually preferred method, Compound VIIIa is reacted with an acylation agent in order to form a compound of the Formula IXa, in a method analogous to that described hereabove in paragraph (f). The Compound IXa is then subjected to the action of a bromination agent in order to form a compound of the Formula XI

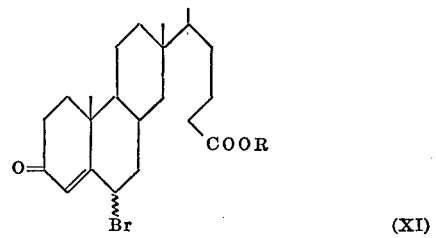

(XI)

and this latter Compound XI is subject to a dehydrobromination in order to obtain Compound VIIIb.

The bromination agent is preferably N-bromosuccinimide in the midst of a mixture of dimethylformamide and water. Bromine can also be utilized as the bromination agent, while operating, for example, in the presence of a mixture of acetic acid and collidine.

Compound XI can also be obtained by direct bromination of Compound VIIIa by means of bromine in the presence of an acid.

In order to effect the dehydrobromination of Compound XI, the reaction is conducted by a lithium halide, such as lithium bromide, preferably in the presence of lithium carbonate, in the midst of a dialkylamide such as dimethylformamide.

The double bond in the 6(7) position can also be introduced while preparing intermediarily an enolic ether of Compound VIIIa by the action of an etherification agent selected from the group consisting of an orthoformiate of a lower alkyl of the formula

wherein Y is a lower alkyl, such as ethyl orthoformiate, or a 2,2-dialkoxypropane of the formula

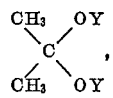

such as 2,2-dimethoxypropane. This enolic ether is a compound of the Formula XII

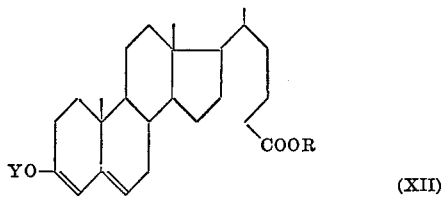

(XII)

wherein R is lower alkyl and Y is lower alkyl, having preferably from 1 to 4 carbon atoms, and is next transformed into Compound VIIIb either by bromination followed by dehydrobromination, or directly by the action of a dehydrogenating agent such as, for example, dichloro-dicyanobenzoquinone in an aqueous medium, for example, in the presence of a mixture of acetone and water.

The bromination of the compound of Formula XII is effected, for example, by the action of N-bromosuccinimide, and the dehydrobromination, by the action of an alkali metal or alkaline earth metal carbonate in dimethylformamide.

The introduction of the double bond allowing passage of Compound VIIIa to Compound VIIIb can also be effected directly by the action of a dehydrogenating agent such as chloranil. This reaction is conducted, for example, by heating in the presence of tert. butanol or xylene.

(i) Passage of Compound Ia to Compound VIIIb

Compound VIIIb can also be prepared starting from Compound Ia by means of a dehydrogenating agent such as manganese bioxide, or also by means of quinone or benzoquinone in the presence of an aluminum alcoholate such as aluminum isopropylate or tert. butylate. The reaction with manganese bioxide is effected by heating in a hydrocarbon such as benzene.

(j) Preparation of Compound VI according to the Arndt-Eistert reaction

After the diazoketone intermediate of Compound II is formed, it is decomposed in the presence of a metallic catalyst. The metallic catalyst utilized is particularly a catalyst based on silver, copper or platinum. Preferably, a catalyst based on silver is utilized.

When the decomposition is effected in the presence of water, for example by means of an aqueous suspension of silver oxide, the acid of Formula VI' is obtained, with $R_3$=H. When the decomposition is effected by means of a lower alkanol R—OH, in the presence of silver oxide, or also in the presence of an organic salt of silver in the presence of a tertiary base (for example, silver benzoate in the presence of triethylamine), an ester of the Formula VI' is obtained, with $R_3$=R.

In either case, the hydroxyl in the 3 position is liberated by saponification by means of an alkaline base, such as aqueous sodium or potassium hydroxide. The carboxylic group of the product obtained (VI', $R_3$=H) is then esterified according to usual methods, for example by the action of a diazo-lower alkane, such as diazomethane diazoethane, or by the action of a lower alkanol, ROH, in the presence of an acid catalyst.

The processes described above allow the obtaining of the following novel products.

(1) The compounds of Formula VIII, and particularly the methyl ester of 3-oxo-26,27-dinorcholest-4-en-25-oic acid, and the methyl ester of 3-oxo-26,27-dinorcholesta-4,6-dien-25-oic acid;

(2) The compounds of Formula VI''

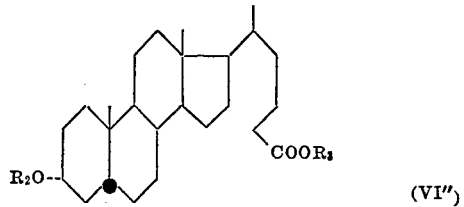

(VI'')

wherein $R_2$ is hydrogen or the acyl of an organic carboxylic acid ($R_1$) and $R_3$ is hydrogen or lower alkyl (R) and particularly the methyl ester of 3α-hydroxy-26,27-dinor-5β-cholestan-25-oic acid;

(3) The compounds of the formula

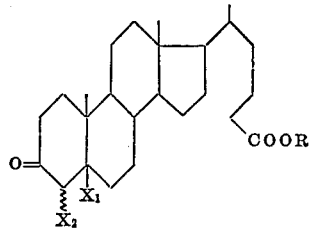

wherein R is lower alkyl, $X_1$ is a hydrogen in the 5β position and $X_2$ is hydrogen or bromine, and particularly the methyl ester of 3 - oxo - 26,27 - dinor-5β-cholestan-25-oic acid and the methyl ester of 3-oxo-4-bromo-26,27-dinor-5β-cholestan-25-oic acid; this latter formula encompasses the compounds of Formulas VII and X;

(4) The compounds of Formula IX, and particularly the methyl ester of 3-acetoxy-26,27-dinor-cholesta-3,5-dien-25-oic acid and the methyl ester of 3-acetoxy-26,27-dinor-cholesta-3,5,7-trien-25-oic acid;

(5) The compounds of Formula XI, and particularly the methyl ester of 3-oxo-6β-bromo-26,27-dinorcholest-4-en-25-oic acid;

(6) The compounds of Formula Ib, and particularly the methyl ester of 3β-hydroxy-26,27-dinorcholesta-5,7-dien-25-oic acid;

(7) The compounds of Formula XII; as well as (8) The following products (a) 3α-acetoxy-23,23-dimethoxy-24-nor-5β-cholane, and
(b) the methyl ester of 3α-hydroxy-26,27-dinor-23-trans-5β-cholest-23-en-25-oic acid.

The following examples illustrate the invention without, however, limiting the same in any respect.

EXAMPLE I

Preparation of the methyl ester of 3β-hydroxy-26,27-dinorcholest-5-en-25-oic acid Step A.—3α-acetoxy - 23 - oxo-24-nor-5β-cholane: 100 gm. of 3α-acetoxy-24,24-diphenyl-5β-chol-23-ene were dissolved in 800 cc. of methylene chloride. The solution was cooled to −60° C. and a stream of ozonized oxygen was bubbled therethrough for a period of 3 hours while maintaining this temperature. Then the dissolved oxygenated gas was eliminated by bubbling a stream of nitrogen therethrough. Thereafter, 150 gm. of powdered zinc was added to the solution, and then 225 cc. of acetic acid were added thereto. The temperature of the solution was allowed to mount to 0° C. The excess zinc was separated by filtration. The filtrate was washed with a 5% aqueous solution of sodium bicarbonate and then evaporated to dryness under reduced pressure. The residue obtained comprises a mixture of 3α-acetoxy-23-oxo-24-nor-5β-cholane and benzophenone. The desired product was isolated in the form of the dimethylketal which was thereafter hydrolyzed. The method was the following:

Ketalization: The residue obtained above was mixed with 300 cc. of methanol. Then 5 cc. of a 20% methanolic solution of acetyl chloride was added thereto. The mixture was agitated for a period of one hour at ambient temperature, then cooled to between 0 and $+5°$ C. The precipitate formed was isolated by filtration and was recrystallized from methanol. 59.4 gm. of 3α-acetoxy-23,23-dimethoxy-24-nor-5β-cholane was obtained at a melting point of 133 to 134° C., and a specific rotation, $[\alpha]_D^{20}=+40.5°$ (c.=0.5% in chloroform).

Analysis.—Calculated for $C_{27}H_{46}O_4$ (molecular weight =434.64) (percent): C, 74.61; H, 10.67. Found (percent): C, 74.3; H, 10.5.

Hydrolysis of the ketal: 50 gm. of the ketal obtained above was placed in suspension in 400 cc. of acetone containing 20% of water. Then 10 cc. of concentrated hydrochloric acid was added. The suspension was heated to reflux for a period of 30 minutes, then cooled to ambient temperature. 400 cc. of water was added progressively to the suspension and the crystals formed were isolated by filtration. 44 gm. of 3α-acetoxy-23-oxo-24-nor-5β-cholane were obtained, having a melting point of 138° C. and a specific rotation $[\alpha]_D^{20}=+33°$ (c.=0.5% in chloroform).

Analysis.—Calculated for $C_{25}H_{40}O_3$ (molecular weight =388.57) (percent): C, 77.27; H, 10.37. Found (percent): C, 77.0; H, 10.1.

Step B.—The methyl ester of 3β-hydroxy-26,27-dinor-23-trans-5β-cholest-23-en-25-oic acid: 6.7 gm. of sodium methylate and 100 cc. of methanol were introduced into a balloon flask. Slowly, while agitating at a temperature between 0 and $+5°$ C., a solution of 26 gm. of methyl diethylphosphonoacetate in 50 cc. of methanol were added. Next 40 gm. of 3α-acetoxy-23-oxo-24-nor-5β-cholane, then 100 cc. of methanol were added progressively to the above solution. The mixture was agitated for a period of 15 hours at about 0° C. Next, while maintaining the same temperature, 500 cc. of iced water, then 10.6 cc. of concentrated hydrochloric acid were added, and the agitation was continued for one hour. The crystals formed were isolated by filtration and 41.4 gm. of the methyl ester of 3α-hydroxy - 26,27 - dinor-23-trans-5β-cholest-23-en-25-oic acid were obtained having a melting point of 120° C., and a specific rotation of $[\alpha]_D^{20}=+32.5°$ (c.=1% in chloroform).

Analysis.—Calculated for $C_{26}H_{42}O_3$ (molecular weight =402.60) (percent): C, 77.56; H, 10.52. Found (percent): C, 77.7; H, 10.4.

U.V. Spectra (ethanol): max. at 213 nm.

$$E^{1\%}_{1\,cm.}=373$$

The R.M.N. spectra establishes that the methoxycarbonyl grouping is in a trans position with reference to the methylene in the 22-position.

Step C.—The methyl ester of 3α-hydroxy-26,27-dinor-5β-cholestan-25-oic acid: 4 gm. of the methyl ester of 3α-hydroxy-26,27-dinor-23-trans-5β - cholest-23-en-25-oic acid were dissolved in 60 cc. of methanol. 1 gm. of palladized talc (containing 2% of palladium) was added to the mixture, and a stream of hydrogen was passed therethrough at ambient temperature for a period of 40 minutes. The catalyst was separated by filtration and the reaction mixture was evaporated to dryness.

The residue was recrystallized from methanol. 4 gm. of the methyl ester of 3α-hydroxy-26,27-dinor-5β-cholestan-25-oic acid were obtained having a melting point of 110° C., and a specific rotation $[\alpha]_D^{20}=+28.5°$ (c.=1% in chloroform).

Analysis.—Calculated for $C_{26}H_{44}O_3$ (molecular weight =404.7) (percent): C, 77.18; H, 10.96. Found (percent): C, 77.1; H, 11.1.

Step D.—The methyl ester of 3-oxo-26,27-dinor-5β-cholestan-25-oic acid: 40 gm. of the methyl ester of 3α-hydroxy-26,27-dinor-5β-cholestan-25-oic acid were introduced into 400 cc. of acetone. An excess of a solution of chromic anhydride in aqueous sulfuric acid (Jones mixture) was added progressively to the solution held at 20° C.

The mixture was agitated for a period of a further hour, and then poured into water. 36 gm. of the methyl ester of 3-oxo-26,27-dinor-5β-cholestan-25-oic acid were separated by filtration, having a melting point of 101° C., and a specific rotation of $[\alpha]_D^{20}=+31.5°$ (c.=1% in chloroform).

Analysis.—Calculated for $C_{26}H_{42}O_3$ (molecular weight =402.6) (percent): C, 77.56; H, 10.52; O, 11.92. Found (percent): C, 77.2; H, 10.5; O, 12.2.

Step E.—The methyl ester of 3-oxo-4-bromo-26,27-dinor-5β-cholestan-25-oic acid: 21 gm. of the methyl ester of 3-oxo-26,27-dinor-5β-cholestan-25-oic acid were placed in suspension in 100 cc. of dimethylformamide. The mixture was heated to 40° C. and one drop of hydrobromic acid was added thereto. Then progressively 3 cc. of bromine were added. Next 1 liter of a mixture of water and ice were slowly added thereto. The precipitate formed was isolated by filtration and 17 gm. of the methyl ester of 3-oxo-4-bromo-26,27-dinor-5β-cholestan-25-oic acid were obtained having a specific rotation of $[\alpha]_D^{20}=+43°$ (c.=1% in chloroform).

Analysis.—Percent bromine: 16.6 (theoretical: 17.9).

The product was characterized by chromatography on a thin bed by $R_f=0.63$ (support: silica gel, Kieselgel GF 254; eluant: benzene/ethyl acetate 7–3).

Step F.—The methyl ester of 3-oxo-26,27-dinorcholest-4-en-25-oic acid: 80 cc. of dimethylformamide, 16 gm. of lithium carbonate and 8 gm. of lithium bromide were introduced into a balloon flask while agitating. The mixture was heated to about 95° C. after adding 16 gm. of the methyl ester of 3-oxo-4-bromo-26,27-dinor-5β-cholestan-25-oic acid. The reaction mixture was maintained for a period of 15 hours at the same temperature. Next the reaction mixture was cooled to $+30°$ C. and poured into 800 cc. of a mixture of water and ice and 30 cc. of acetic acid. After 15 minutes of agitation the solid residue was separated by decantation and dissolved in 100 cc. of chloroform. The solution was washed with water until the wash waters were neutral, and then evaporated to dryness under vacuum. The residue was taken up with 250 cc. of methanol. The mixture was agitated for a period of 30 minutes at 0° C. and then by filtration, 9 gm. of the methyl ester of 3-oxo-26,27-dinorcholest-4-en-25-oic acid were obtained having a melting point of 170° C. and a specific rotation of $[\alpha]_D^{20}=+81°$ (c.=1% in chloroform).

Analysis.—Calculated for $C_2H_{40}O_3$ (molecular weight =400.5) (percent): C, 78; H, 10.0. Found (percent): C, 77.9; H, 10.0.

U.V. Spectra (ethanol): max at 241 nm.

$$E^{1\%}_{1\,cm.}=400$$

Step G.—The methyl ester of 3-acetoxy-26,27-dinor-cholesta-3,5-dien-25-oic acid: 6 gm. of the methyl ester of 3-oxo-26,27-dinorcholest-4-en-25 oic acid, 12 cc. of acetic anhydride and 6 cc. of acetyl chloride were mixed. The reaction mixture was heated to reflux for a period of 1 hour, then evaporated to dryness under vacuum. The residue was recrystallized from isopropylether. 4.6 gm. of the methyl ester of 3-acetoxy-26,27-dinorcholesta-3,5-dien-25-oic acid were obtained having a melting point of 106° C. and a specific rotation of $[\alpha]_D^{20}=-83.5°$ (c.=1% in chloroform).

The R.M.N. spectra is in accord with the structure indicated.

Step H.—The methyl ester of 3β-hydroxy-26,27-dinor-cholest-5-en-25-oic acid: 4 gm. of the methyl ester of 3-acetoxy-26,27-dinorcholesta-3,5-dien-25-oic acid and 32 cc. of tetrahydrofuran were mixed. Next at 0° C., 8 cc. of methanol and 0.8 gm. of sodiumborohydride, then 4 cc. of water were introduced into the mixture. Then, slowly and at the same temperature, 9.5 cc. of an aqueous normal solution of sodium hydroxide were added. Then the mixture was agitated for a period of 1 hour. The mixture was next acidified by the addition of 4 cc. of acetic acid and 8 cc. of water. The methanol and the tetrahydrofuran were distilled under reduced pressure while maintaining the volume of the mixture constant by the addition of water. The solid formed was separated by filtration. This solid was a mixture of 3β-hydroxy-26,27-dinorcholest-5-en-25-oic acid and its methyl ester. In order to convert the acid into the methyl ester, this mixture was reacted with 40 cc. of methanol and 0.5 cc. of acetyl chloride for a period of 24 hours at room temperature, 1.2 gm. of the methyl ester of 3β-hydroxy-26,27-dinorcholest-5-en-25-oic acid was isolated by filtration and washing with methanol. The R.M.N. spectra is in accord with the structure indicated. This compound is described by Dauben, J. Am. Chem. Soc., 74, 559 (1952).

EXAMPLE II

Preparation of the methyl ester of 3β-hydroxy-26,27-dinorcholesta-5,7-dien-25-oic acid Step A.—The methyl ester of 3-oxo-26,27-dinorcholesta-4,6-dien-25-oic acid: 20 gm. of the methyl ester of 3-acetoxy-26,27-dinorcholesta-3,5-dien-25-oic acid were placed in suspension in a mixture of 60 cc. of dimethylformamide and 1 cc. of water. The suspension was cooled to about 0° C. and slowly, over a period of 1 hour, 8.5 gm. of N-bromosuccinimide was added thereto while agitating and maintaining the temperature between 0 and +2° C. A progressive dissolution of the product in suspension was observed and by the end of the introduction of the reactant a partial precipitation of the methyl ester of 3-oxo-6β-bromo-26,27-dinorcholest-4-en-25-olic acid was observed.

The agitation was continued for a period of 15 minutes, then 10 gm. of lithium carbonate and 5 gm. of lithium bromide were added to the reaction medium. The suspension was agitated under an atmosphere of nitrogen and heated over a period of 30 minutes to 95° to 100° C. The agitation was continued at this temperature for a period of 3 hours. Then the reaction mixture was cooled to 20° to 25° C., then poured into a mixture containing 250 cc. of water, 250 gm. of ice and 20 cc. of acetic acid. This mixture was agitated for a period of 1 hour. The precipitate was separated by filtration, washed with water, and dried.

By recrystallization from ethyl acetate, 13.5 gm. of methyl ester of 3-oxo-26,27-dinorcholesta-4,6-dien-25-oic acid was obtained having a melting point of 160° C.; and a specific rotation $[\alpha]_D^{20} = +28° \pm 1°$ (c.=1% in chloroform).

U.V. Spectra (ethanol): max.=285 nm. $\epsilon$=25.950.

Analysis.—Calculated for $C_{26}H_{38}O_3$ (molecular weight =398.56) (percent): C, 78.4; H, 9.6. Found (percent): C, 78.2; H, 9.5.

Step B.—The methyl ester of 3-acetoxy-26,27-dinorcholesta-3,5,7-trien-25-oic acid: 10 gm. of the methyl ester of 3-oxo-26,27-dinorcholesta-4,6-dien-25-oic acid were mixed with 50 cc. of acetic anhydride, 8 cc. of pyridine and 25 cc. of acetyl chloride. The mixture was heated at reflux for a period of 6 hours under an inert atmosphere and then evaporated to dryness. By successive recrystallization of the residue from methanol, the methyl ester of 3-acetoxy-26,27-dinorcholesta-3,5,7-trien-25-oic acid was obtained.

U.V. Spectra (ethanol): max.=301, 314 and 330 nm.

The product is immediately reduced according to the method described in the following step.

Step C.—The methyl ester of 3β-hydroxy-26,27-dinorcholesta-5,7-dien-26-oic acid: 10 gm. of methyl ester of 3-acetoxy-26,27-dinorcholesta-3,5,7-trien-25-oic acid were mixed with 25 cc. of tetrahydrofuran, 25 cc. of water, 25 cc. of methanol and then 2.5 gm. of sodium borohydride.

The reaction mixture was agitated for a period of 16 hours at room temperature, then the solvents were eliminated by distillation under reduced pressure. A precipitate in water of the methyl ester of 3β-hydroxy-26,27-dinorcholesta-5,7-dien-25-oic acid, partially saponified, was obtained, which was converted completely into the methyl ester by the action of methanol in the presence of hydrochloric acid as a catalyst.

The product is characterized by the formation of its acetate. The methyl ester of 3β-acetoxy-26,27-dinorcholesta-5,7-dien-25-oic acid was obtained identical to the product described by Campbell et al., Steroids, 13, page 574 (1969).

The preceding specific embodiments are illustrative of the pratice of the invention. It is to be understood, however, that other embodiments known to those skilled in the art or described herein may be employed without departing from the spirit of the invention or the scope of the appended claims.

We claim:
1. A process for the preparation of esters of 26,27-dinorcholestadien-25-oic acid of the formula

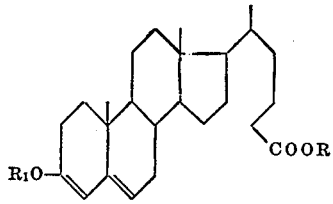

wherein $R_1$ represents the acyl of an organic carboxylic acid having 1 to 10 carbon atoms and R represents lower alkyl, which consists essentially of the steps of
(a) subjecting a compound of the formula

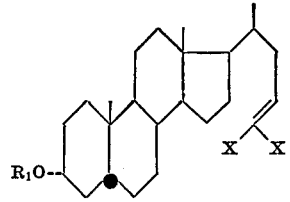

wherein $R_1$ represents the acyl of an organic carboxylic acid having from 1 to 10 carbon atoms and X represents a member selected from the group consisting of lower alkyl, cycloalkyl having 5 to 6 carbon atoms and phenyl, to the action of ozone and thereafter to the action of a reducing agent,
(b) performing a Wittig reaction with a Wittig reactant selected from the group consisting of lower alkyl O,O-dilower alkylphosphonoacettae and an alkylidene phosphorane of the formula

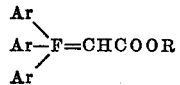

wherein R is lower alkyl and Ar is phenyl on the resultant compound of the formula

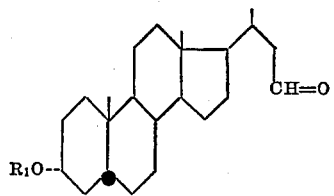

wherein $R_1$ has the above-assigned meaning, (c) subjecting the resultant compound of the formula

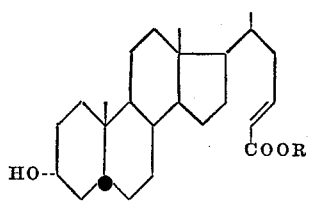

wherein R represents lower alkyl, to a catalytic hydrogenation with hydrogen in the presence of a catalyst based on metals selected from the group consisting of palladium, platinum and nickel, (d) oxidizing the resultant compound of the formula

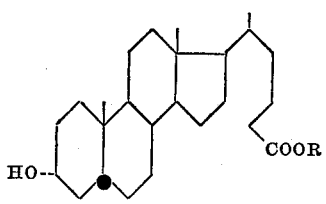

wherein R has the above-assigned meaning by the action of an oxidizing agent capable of oxidizing a hydroxy to a ketone, (e) brominating the resultant compound of the formula

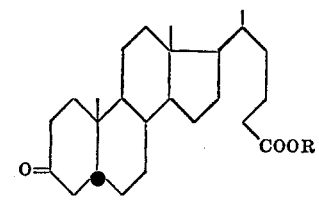

wherein R has the above-assigned meaning, by the action of a monobrominating agent, (f) reacting the resultant compound of the formula

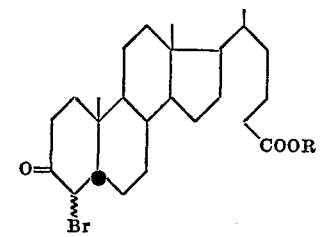

wherein R has the above-assigned meaning, with a dehydrobrominating agent, (g) reacting the resultant compound of the formula

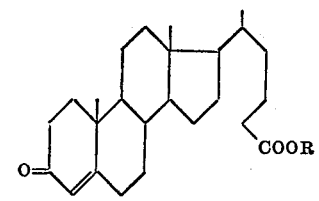

wherein R has the above-assigned meaning, with an acylating derivative of an organic carboxylic acid having 1 to 10 carbon atoms, and (h) recovering said esters of 26,27-dinorcholestadien-25-oic acid.

2. The process of claim 1 wherein said reducing agent of step (a) is zinc in the presence of acetic acid.

3. The process of claim 1, step (d), wherein said oxidizing agent capable of oxidizing a hydroxy to a ketone is selected from the group consisting of chromic anhydride, bromine in the presence of a buffer, an N-haloamide, a ketone in the presence of an aluminum alcoholate and cyclohexanone in the presence of Raney nickel.

4. The process of claim 1, step (e), wherein said monobrominating agent is selected from the group consisting of bromine, an alkali metal bromate, the hydrobromide of perbromopyridine and N-bromosuccinimide.

5. The process of claim 1, step (f), wherein said dehydrobrominating agent is selected from the group consisting of a lithium halide in the presence of a di-lower alkylamide of a lower alkanoic acid, heating in the presence of a pyridine base, a semi-carbazide followed by an exchange reaction with a carbonylated derivative, a hydrazine followed by an exchange reaction with a carbonylated derivative, a lower alkylhydrazine followed by an exchanged reaction with a carbonylated derivative, and a phenylhydrazine followed by an exchange reaction with a carbonylated derivative.

6. The process of claim 1, step (g), wherein said acylating derivative is selected from the group consitsing of an acid anhydride of the formula $(R_1CO)_2O$ and a mixture of said acid anhydride and the corresponding acid chloride, where $R_1$ has the above-assigned meaning.

7. The process of claim 1 wherein R is methyl.

8. The process of claim 1 wherein $R_1$ is the acyl of an organic carboxylic acid having 1 to 10 carbon atoms selected from the group consisting of alkanoic acids, cycloalkylcarboxylic acids, cycloalkylalkanoic acids, benzoic acid, alkylbenzoic acids, phenylalkanoic acids and alkylphenylalkanoic acids.

9. A process for the preparation of esters of 26,27-dinorcholesten-25-oic acids of the formula

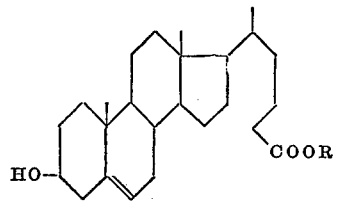

wherein R represents lower alkyl, which consists essentially of the steps of reducing the 3,4 double bond of a compound of the formula

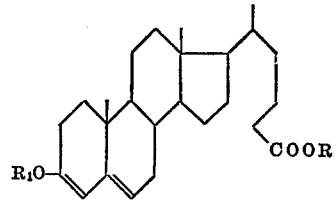

wherein $R_1$ represents the acyl of an organic carboxylic acid having 1 to 10 carbon atoms and R represents lower alkyl, by the action of a mixed hydride selected from the group consisting of alkali metal borohydride, aluminum lithium hydride, and lithium tri-tert.-butoxyaluminum hydride and recovering said esters of 26,27-dinorcholesten-25-oic acids.

10. A process for the preparation of esters of 26,27-dinorcholestadien-25-oic acids of the formula

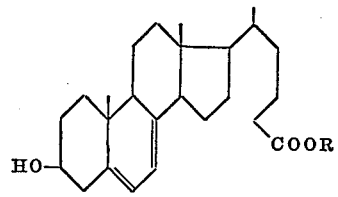

wherein R represents lower alkyl, which consists essentially of the steps of (a) subjecting a compound of the formula

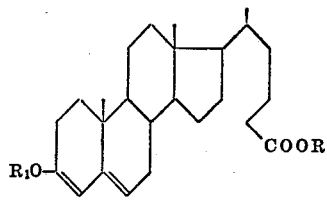

wherein $R_1$ represents the acyl of an organic carboxylic acid having 1 to 10 carbon atoms and R represents lower alkyl to the action of a monobrominating agent, (b) reacting the resultant compound of the formula

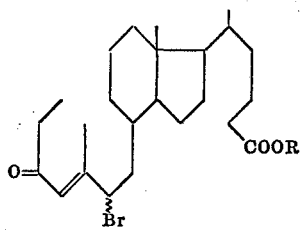

wherein R has the above-assigned meaning, with a dehydrobrominating agent, (c) reacting the resultant compound of the formula

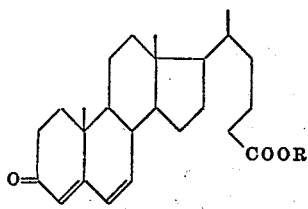

wherein R has the above-assigned meaning, with an acylating derivative of an organic carboxylic acid having 1 to 10 carbon atoms, (d) reducing the 3,4 double bond of the resultant compound having the formula

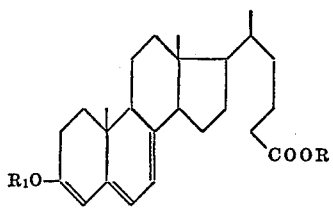

wherein R and $R_1$ have the above-assigned meanings, by the action of a mixed hydride, and (e) recovering said esters of 26,27-dinorcholestadien-25-oic acids.

11. The process of claim 10, step (a), wherein said monobrominating agent is selected from the group consisting of bromine, an alkali metal bromate, the hydrobromide of perbromopyridine and N-bromosuccinimide.

12. The process of claim 10, step (b), wherein said dehydrobrominating agent is selected from the group consisting of a lithium halide in the presence of a di-lower alkylamide of a lower alkanoic acid, heating in the presence of a pyridine base, a semi-carbazide followed by an exchange reaction with a carbonylated derivative, a hydrazine followed by an exchange reaction with a carbonylated derivative, a lower alkylhydrazine followed by an exchange reaction with a carbonylated derivative, and a phenylhydrazine followed by an exchange reaction with a carbonylated derivative.

13. The process of claim 10, step (c), wherein said acylating derivative is selected from the group consisting of an acid anhydride of the formula $(R_1CO)_2O$ and a mixture of said acid anhydride and the corresponding acid chloride, where $R_1$ has the above-assigned meaning.

14. The process of claim 10, step (d), wherein said mixed hydride is selected from the group consisting of alkali metal borohydride, aluminum lithium hydride, and lithium tri-tert.-butoxyaluminum hydride.

15. A compound of the formula

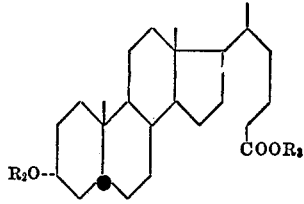

wherein $R_2$ is a member selected from the group consisting of hydrogen and the acyl of an organic carboxylic acid having 1 to 10 carbon atoms and $R_3$ is a member selected from the group consisting of hydrogen and lower alkyl.

16. A compound of the formula

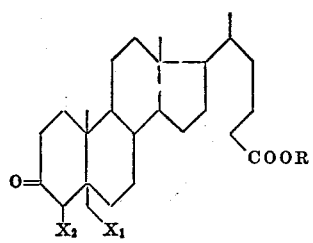

wherein R is lower alkyl, $X_1$ is a $5\beta$ hydrogen and $X_2$ is bromine.

17. A compound of the formula

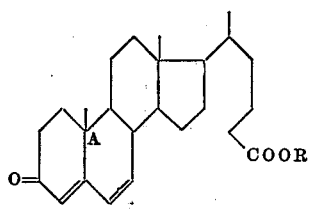

wherein R is lower alkyl and A is a double bond.

18. A compound of the formula

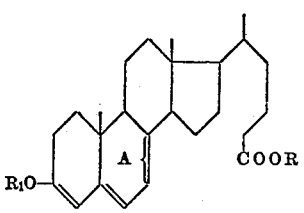

wherein R is lower alkyl, $R_1$ is the acyl of an organic carboxylic acid having 1 to 10 carbon atoms and A is a member selected from the group consisting of two hydrogens and a double bond.

19. A compound of the formula

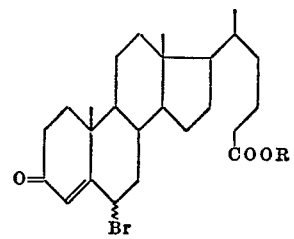

wherein R is lower alkyl.

20. A compound of the formula

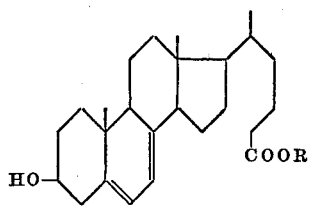

wherein R is lower alkyl.

21. A process for the preparation of a compound of the formula

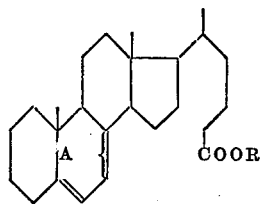

wherein R is lower alkyl and A may be 2 hydrogens or a double bond comprising reacting a compound of the formula

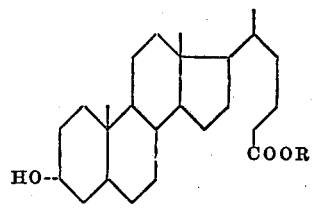

wherein R is lower alkyl with an oxidizing agent capable of oxidizing a hydroxy to a ketone to obtain a compound of the formula

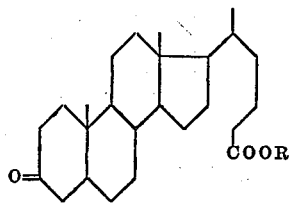

subjecting the latter to a bromination reaction and then a dehydrobromination reaction to obtain a compound of the formula

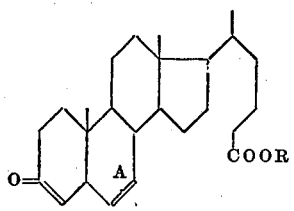

reacting the latter with an acylation agent to obtain a compound of the formula wherein $R_1$ is the acyl of an organic carboxylic acid of 1 to 10 carbon atoms and reducing the latter with a mixed hydride selected from the group consisting of alkali metal borohydride, aluminum lithium hydride and lithium tri-tert.butoxy aluminum hydride to obtain the desired compound.

References Cited
UNITED STATES PATENTS
3,560,558   2/1971   Hayakawa et al. _____ 260—514

ELBERT L. ROBERTS, Primary Examiner

U.S. Cl. X.R.

260—397.2

UNITED STATES PATENT OFFICE
CERTIFICATE OF CORRECTION

Patent No. 3,801,607      Dated Apr. 2, 1974    Page 1 of

Inventor(s) BERNARD GOFFINET

It is certified that error appears in the above-identified patent and that said Letters Patent are hereby corrected as shown below:

| IN THE PATENT | | IN THE APPLICATION | |
|---|---|---|---|
| Col. | Line | Page | Line |
| 2 | 20 | 3 | 11 |

" 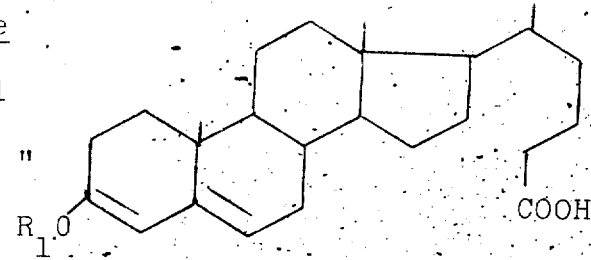 "

should be

-- 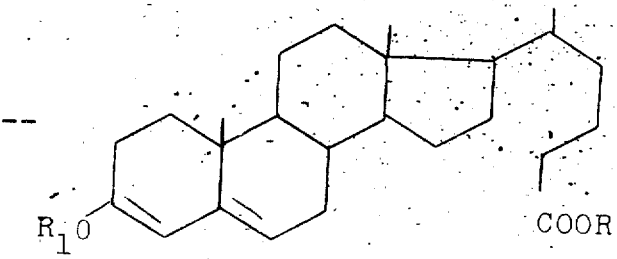 --

| | | | |
|---|---|---|---|
| 3 | 10 | 5 | 1 |

" 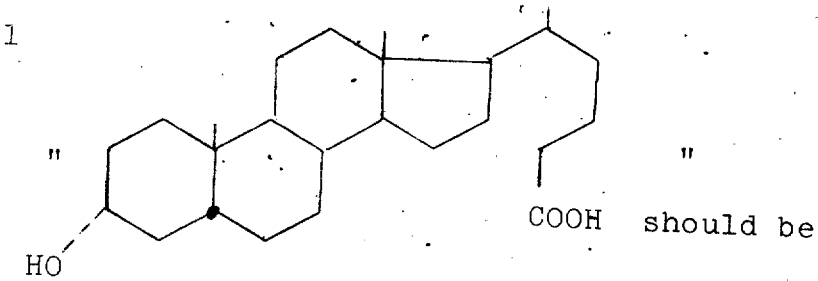 should be

-- 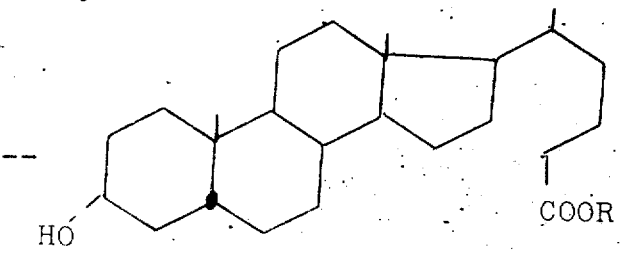 --

CERTIFICATE OF CORRECTION

Patent No. 3,801,607     Dated Apr. 2, 1974

Inventor(s) BERNARD COFFINET

It is certified that error appears in the above-identified patent and that said Letters Patent are hereby corrected as shown below:

| IN THE PATENT | | IN THE APPLICATION | | |
|---|---|---|---|---|
| Col. | Line | Page | Line | |
| 6 | 57 | 12 | 3 | "ylopentyl-or yclohexyl-acetic should be --cyclopentyl- or cyclohexyl-acetic-- |
| 9 | 20 | 17 | 1 | After the "formula" insert --II-- |
| 10 | 50 | 20 | 2 | "23-ene-25-olo" should be --23-en-25-oic-- |
| 17 | 72 | 37 | 2 | "26-oic acid" should be --25-oic acid-- |
| 18 | 60 | | | " $\begin{array}{c}Ar \\ Ar\end{array}\!\!-\!\!P = CHCOOR$ " should be -- $\begin{array}{c}Ar \\ Ar\end{array}\!\!-\!\!P = CHCOOR$ -- |

Signed and sealed this 1st day of October 1974.

(SEAL)
Attest:

McCOY M. GIBSON JR.
Attesting Officer

C. MARSHALL DANN
Commissioner of Patents